United States Patent
Hoshizaki et al.

(10) Patent No.: US 12,452,841 B2
(45) Date of Patent: Oct. 21, 2025

(54) BASE STATION, TERMINAL AND COMMUNICATION METHOD FOR PERFORMING DUAL CONNECTIVITY (DC) IN MULTIPLE RADIO ACCESS TECHNOLOGIES (RAT)

(71) Applicant: NTT DOCOMO, INC., Tokyo (JP)

(72) Inventors: Yuuya Hoshizaki, Tokyo (JP); Junpei Yamamoto, Tokyo (JP); Shinichirou Kitazawa, Tokyo (JP); Masato Taniguchi, Tokyo (JP); Tarou Yamada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 360 days.

(21) Appl. No.: 18/012,154

(22) PCT Filed: Aug. 5, 2020

(86) PCT No.: PCT/JP2020/029970
§ 371 (c)(1),
(2) Date: Dec. 21, 2022

(87) PCT Pub. No.: WO2022/029919
PCT Pub. Date: Feb. 10, 2022

(65) Prior Publication Data
US 2023/0247591 A1    Aug. 3, 2023

(51) Int. Cl.
*H04W 72/04* (2023.01)
*H04W 8/24* (2009.01)
*H04W 72/51* (2023.01)

(52) U.S. Cl.
CPC ............. *H04W 72/04* (2013.01); *H04W 8/24* (2013.01); *H04W 72/51* (2023.01)

(58) Field of Classification Search
CPC ....... H04W 72/04; H04W 72/51; H04W 8/24; H04W 72/21; H04W 72/0413;
(Continued)

(56) References Cited

U.S. PATENT DOCUMENTS

2016/0338039 A1* 11/2016 Van Der Velde ..... H04L 5/0032
2017/0164419 A1* 6/2017 Kim ...................... H04W 76/28
(Continued)

FOREIGN PATENT DOCUMENTS

JP    2019-036873 A    3/2019
WO    2019/146542 A1   8/2019

OTHER PUBLICATIONS

European Search Report issued in 20947936.9 on Mar. 13, 2024 (12 pages).
(Continued)

*Primary Examiner* — Rushil P. Sampat
(74) *Attorney, Agent, or Firm* — Osha Bergman Watanabe & Burton LLP

(57) ABSTRACT

A base station, that is a first base station performing dual connectivity together with a second base station, includes: a control unit configured to determine a candidate list of band combinations used for the dual connectivity, the candidate list being determined based on a capability related to the first base station; a transmission unit configured to transmit the candidate list to the second base station; and a reception unit configured to receive, from the second base station, information indicating a preferable band combination selected from the candidate list by the second base station.

8 Claims, 9 Drawing Sheets

(58) Field of Classification Search
CPC ..... H04W 76/15; H04W 24/02; H04W 24/10; H04W 74/0833; H04W 76/02; H04W 76/10; H04W 88/08; H04W 88/06; H04W 92/20; H04L 5/001; H04L 5/0032; H04L 5/0053
See application file for complete search history.

(56) References Cited

U.S. PATENT DOCUMENTS

2017/0223762 A1\* 8/2017 Worrall ................ H04W 24/10
2020/0367318 A1 11/2020 Takahashi et al.

OTHER PUBLICATIONS

3GPP TSG-RAN2 Meeting AH-1807; "[D101] Correction on allowed BC list for BC capability coordination"; R2-1810669; Montreal, Canada, Jul. 2-6, 2018 (2 pages).
3GPP TSG-RAN WG2 #107; "Returning multiple BC+FS in CG-Config"; Tdoc R2-1910054; Ericsson, Prague, Czech Republic, Aug. 26-30, 2019 (16 pages).
3GPP TSG-RAN WG2 #107; "Report of Offline discussion #004"; R2-1911752; Nokia, Nokia Shanghai Bell, Prague, Czech Republic, Aug. 26-30, 2019 (3 pages).
Office Action issued in Chinese Application No. 202080104391.5, dated Jul. 25, 2024 (18 pages).
Office Action issued in Japanese Patent Application No. 2022-541402, mailed on Jul. 16, 2024 (6 pages).
Ericsson; "About bandcombinationindex and featureSetEntryIndex"; 3GPP TSG-RAN WG3 #102, Tdoc R3-186878; Spokane, USA; Nov. 12-16 (2 pages).
Ericsson; "Email discussion summary [104#66][NR] UE NR and E-UTRA capabilities for Late drop (Ericsson)"; 3GPP TSG-RAN WG2 #105, Tdoc R2-1901552; Athens, Greece; Feb. 25-Mar. 1, 2019 (13 pages).
Ericsson; "Capability coordination for NE-DC"; 3GPP TSG-RAN WG2 #109e, R2-2002275; Electronic meeting; Feb. 24-Mar. 6, 2020 (15 pages).
International Search Report issued in PCT/JP2020/029970 on Mar. 16, 2021 (5 pages).
Written Opinion of the International Searching Authority issued in PCT/JP2020/029970 on Mar. 16, 2021 (4 pages).
3GPP TS 38.300 V16.2.0; "3rd Generation Partnership Project; Technical Specification Group Radio Access Network; NR; NR and NG-RAN Overall Description; Stage 2 (Release 16)"; Jul. 2020 (148 pages).
3GPP TS 38.331 V16.1.0; "3rd Generation Partnership Project; Technical Specification Group Radio Access Network; NR; Radio Resource Control (RRC) protocol specification (Release 16)"; Jul. 2020 (906 pages).
3GPP TS 38.306 V16.1.0; "3rd Generation Partnership Project; Technical Specification Group Radio Access Network; NR; User Equipment (UE) radio access capabilities (Release 16)"; Jul. 2020 (106 pages).

\* cited by examiner

BASE STATION, TERMINAL AND COMMUNICATION METHOD FOR PERFORMING DUAL CONNECTIVITY (DC) IN MULTIPLE RADIO ACCESS TECHNOLOGIES (RAT)

FIELD OF THE INVENTION

The present invention relates to a base station, a terminal, and a communication method in a wireless communication system.

BACKGROUND OF THE INVENTION

Regarding NR (New Radio) (also referred to as "5G"), or a successor system to LTE (Long Term Evolution), technologies have been discussed which satisfy the following requirements: a high capacity system, high data transmission rate, low delay, simultaneous connection of multiple terminals, low cost, power saving, etc. (for example, Non-Patent Document 1).

In an LTE system or an NR system, a network sends an inquiry to a UE (User Equipment), and obtains information related to UE radio access capabilities (for example, Non-Patent Document 2). The UE radio access capabilities include, for example, a supported maximum data rate, a total layer 2 buffer size, supported band combinations, parameters related to MIMO (multiple-input and multiple-output), parameters related to PDCP (Packet Data Convergence Protocol) layer, parameters related to RLC (Radio Link Control) layer, parameters related to MAC (Medium Access Control) layer, parameters related to a physical layer, or the like (for example, Non-Patent Document 3).

CITATION LIST

Non-Patent Document

[Non-Patent Document 1] 3GPP TS 38.300 V16.2.0 (2020-07)
[Non-Patent Document 2] 3GPP TS 38.331 V16.1.0 (2020-07)
[Non-Patent Document 3] 3GPP TS 38.306 V16.1.0 (2020-07)

SUMMARY OF THE INVENTION

Technical Problem

In conventional technologies, UE capabilities (UE capability) related to respective bands of multiple radio access technologies (RATs) may be determined individually when performing communications via dual connectivity in the multiple RATs, and thus, maximum performance as a whole is not necessarily achieved.

The present invention has been made in view of the above points, and it is an object of the present invention to improve performance at the time of dual connectivity in a wireless communication system.

Solution to Problem

According to the disclosed technology, a base station is provided. The base station includes a transmission unit configured to transmit, to a terminal, a message for requesting a report of terminal capability, in a first radio access technology (RAT); a reception unit configured to receive a message of a terminal capability report including a capability related to the first RAT, a capability related to a second RAT, and a capability related to dual connectivity that uses the first RAT and the second RAT, in the first RAT; and a control unit configured to determine a candidate list of band combinations used for the dual connectivity, the candidate list being determined based on the capability related to the first RAT, wherein the transmission unit transmits the candidate list to a base station in the second RAT, and the reception unit receives, from the base station in the second RAT, information indicating a preferable band combination selected from the candidate list, based on the capability related to the second RAT, by the base station in the second RAT. The reception unit receives, from the base station in the second RAT, information indicating a preferable band combination selected from the candidate list, based on the capability related to the second RAT, by the base station in the second RAT.

Advantageous Effects of Invention

According to an embodiment of the present invention, it is possible to improve performance at the time of dual connectivity in a wireless communication system.

DETAILED DESCRIPTION OF THE PREFERRED EMBODIMENTS

Figure 1:
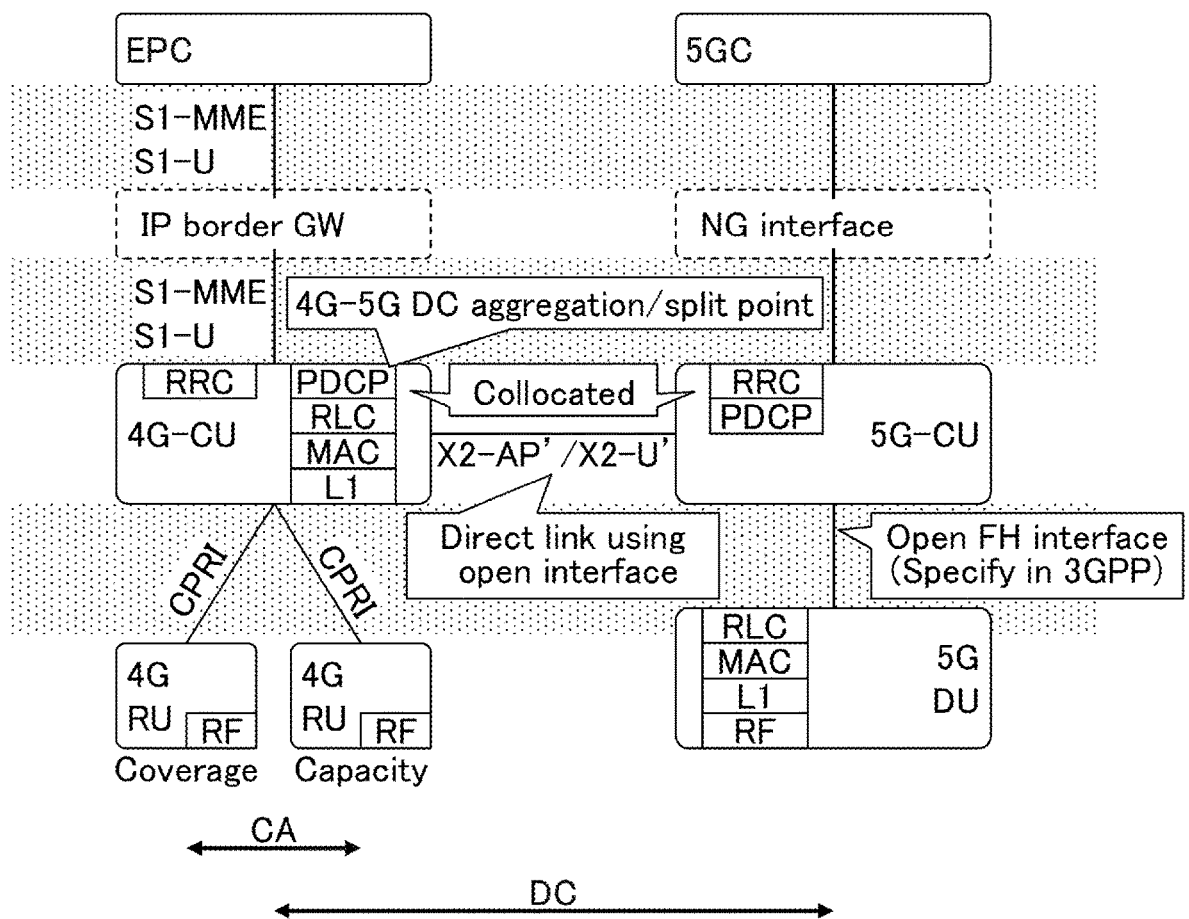
FIG. 1 is a drawing illustrating a configuration example of a network architecture according to an embodiment of the present invention.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR).

Furthermore, in one or more embodiments described below, terms that are used in the existing LTE are used, such as SS (Synchronization signal), PSS (Primary SS), SSS (Secondary SS), PBCH (Physical broadcast channel), PRACH (Physical random access channel), PDCCH (Physical Downlink Control Channel), PDSCH (Physical Downlink Shared Channel), PUCCH (Physical Uplink Control Channel), PUSCH (Physical Uplink Shared Channel), etc. The above-described terms are used for the convenience of description. Signals, functions, etc., which are similar to the above-described terms, may be referred to as different names. Further, the above terms in NR correspond to NR-SS, NR-PSS, NR-SSS, NR-PBCH, NR-PRACH, NR-PDCCH, NR-PDSCH, NR-PUCCH, NR-PUSCH, and the like. However, even when a signal is used for NR, there may be a case in which the signal is not referred to as "NR-".

Furthermore, in an embodiment of the present invention, the duplex scheme may be TDD (Time Division Duplex) scheme, FDD (Frequency Division Duplex) scheme, or other schemes (e.g., Flexible Duplex, or the like).

Further, in an embodiment of the present invention, the expression, radio (wireless) parameters are "configured (set)" may mean that a predetermined value is pre-configured, or may mean that a radio parameter indicated by a base station 10 or a terminal 20 is configured.

FIG. 1 is a drawing illustrating a configuration example of a network architecture according to an embodiment of the present invention. As illustrated in FIG. 1, a radio network architecture in an embodiment of the present invention includes 4G-CU, 4G-RU (Remote Unit, Remote Radio Station), EPC (Evolved Packet Core), etc., on the LTE-Advanced side. The radio network architecture in an embodiment of the present invention includes 5G-CU, 5G-DU, etc., on the 5G side.

As illustrated in FIG. 1, the 4G-CU includes layers of RRC (Radio Resource Control), PDCP (Packet Data Convergence Protocol), RLC (Radio Link Control), MAC (Medium Access Control), and L1 (layer 1, PHY layer, or physical layer), and is connected to the 4G-RU via CPRI (Common Public Radio Interface). A network node including the 4G-CU and the 4G-RU is referred to as eNB.

On the other hand, on the 5G side, as illustrated in FIG. 1, the 5G-CU includes an RRC layer, is connected to the 5G-DU through FH (Fronthaul) interface, and is connected to 5GC (5G Core Network) through NG interface. In addition, the 5G-CU is connected to the 4G-CU through X2 interface. PDCP layer in the 4G-CU is a point of connection or separation in a case where 4G-5G DC (Dual Connectivity), i.e., EN-DC (E-UTRA-NR Dual Connectivity), is performed. A network node including the 5G-CU and the 5G-RU is referred to as gNB. In addition, the 5G-CU may be referred to as gNB-CU, and the 5G-DU may be referred to as gNB-DU.

In addition, as illustrated in FIG. 1, CA (Carrier Aggregation) is performed between 4G-RUs and DC is performed via the 4G-RU and the 5G-DU. Note that, though not shown in the figure, a UE (User Equipment) is wirelessly connected via RF of the 4G-RU or the 5G-DU, and transmits or receives packets.

Note that FIG. 1 illustrates a radio network architecture at the time of LTE-NR DC, i.e., EN-DC (E-UTRA-NR Dual Connectivity). However, the same radio network architecture may be used in a case where the 4G-CU is separated into CU-DU, or in a case where NR standalone operation is performed. In a case where the 4G-CU is separated into CU-DU, functions related to an RRC layer and a PDCP may be moved to the 4G-CU, and functions related to an RLC layer and layer(s) therebelow may be included in the 4G-DU. Note that the data rate of CPRI may be decreased due to the CU-DU separation.

Note that a plurality of 5G-DUs may be connected to the 5G-CU. In addition, NR-DC (NR-NR Dual Connectivity) may be performed by connecting the UE to a plurality of 5G-CUs, and NR-DC may be performed by connecting the UE to a plurality of 5G-DUs and a single 5G-CU. Note that a 5G-CU may be directly connected to EPC without using a 4G-CU, and a 4G-CU may be directly connected to 5GC without using 5G-CU.

In addition, FIG. 1 indicates a radio network architecture at the time of EN-DC but this is by no means limiting. For example, the radio network architecture may indicate NR-DC or NE-DC (NR-EUTRA Dual Connectivity), or another radio network architecture may be adopted. Note that the radio network architecture need not be operated by DC, and may be operated in standalone mode.

Figure 2:
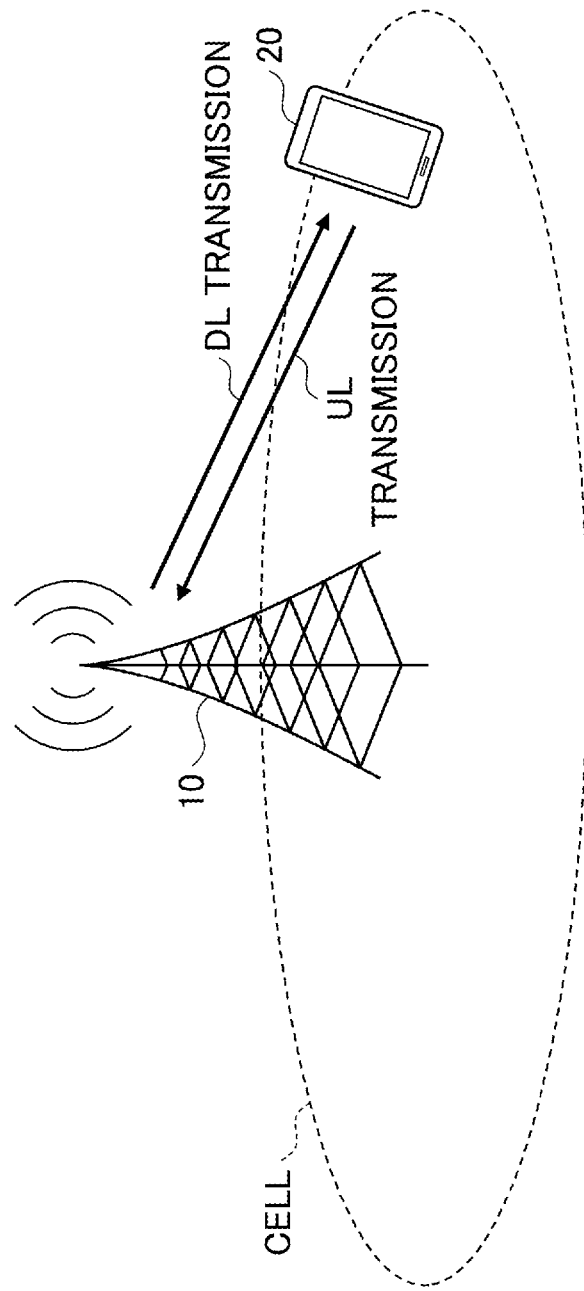
FIG. 2 is a drawing illustrating a configuration example of a wireless communication system according to an embodiment of the present invention.

FIG. 2 is a drawing illustrating a configuration example of a wireless communication system according to an embodiment of the present invention. As illustrated in FIG. 2, a wireless communication system according to an embodiment of the present invention includes a base station 10 and a terminal 20. In FIG. 2, a single base station 10 and a single terminal 20 are illustrated as an example. There may be a plurality of base stations 10 and a plurality of terminals 20.

The base station 10 is a communication device that provides one or more cells and performs wireless communications with the terminal 20. Physical resources of the radio signal may be defined in the time domain and the frequency domain, the time domain may be defined by the number of OFDM symbols, and the frequency domain may be defined by the number of sub-carriers or resource blocks. The base station 10 transmits a synchronization signal and system information to the terminal 20. The synchronization signal is, for example, an NR-PSS and an NR-SSS. The system information is transmitted via, for example, a NR-PBCH, and may be referred to as broadcast information. As shown in FIG. 2, the base station 10 transmits a control signal or data in DL (Downlink) to the terminal 20 and receives a control signal or data in UL (Uplink) from the terminal 20. The base station 10 and terminal 20 are capable of transmitting and receiving a signal by performing the beamforming. Further, the base station 10 and the terminal 20 can both apply MIMO (Multiple Input Multiple Output) communication to DL or UL. Further, both the base station 10 and terminal 20 may perform communications via an SCell (Secondary Cell) and a PCell (Primary Cell) using CA (Carrier Aggregation).

The terminal 20 may be a communication device that includes a wireless communication function such as a smartphone, a mobile phone, a tablet, a wearable terminal, a communication module for M2M (Machine-to-Machine), or the like. As shown in FIG. 2, the terminal 20 uses various communication services provided by the wireless communication system by receiving control signals or data in DL from the base station 10 and transmitting control signals or data in UL to the base station 10.

Here, in 5G-NSA (Non standalone), that is, 5G non-standalone operation, it is described in the technical specifications that, regarding the EN-DC band combinations: a base station 10, as an eNB, provides a base station 10 as a gNB with selection candidates of EN-DC band combinations as an information element "allowedBC-ListMRDC", based on EN-DC band combination capability (UE-MRDC-Capability, UE-EUTRA-Capability, UE-NR-Capability) received from the terminal 20; and the gNB indicates, to the eNB, selected EN-DC band combinations via an information element "selectedBandCombination". The EN-DC band combinations indicate band combinations in communications to which EN-DC is applied.

Figure 3:
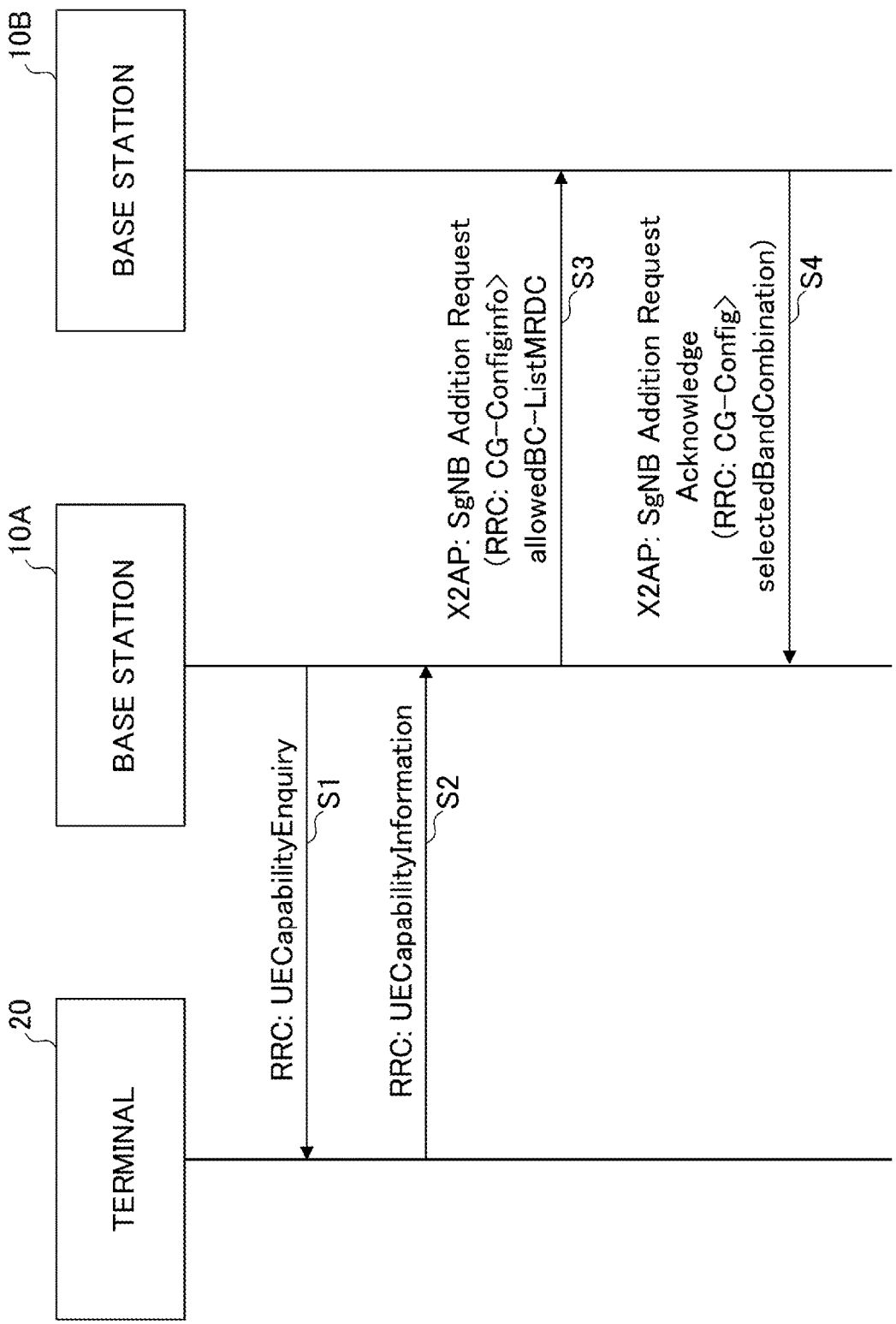
FIG. 3 is a sequence diagram illustrating an example (1) of a communication configuration.

FIG. 3 is a sequence diagram illustrating an example (1) of a communication configuration. In step S1 shown in FIG. 3, a base station 10A, as an eNB, transmits an RRC message "UECapabilityEnquiry" or a query of UE capabilities to a terminal 20. In subsequent step S2, the terminal 20 transmits, regarding the UE capabilities specified by the "UECapabilityEnquiry", an RRC message "UECapabilityInformation" as a report of the UE capabilities, to the base station 10A. The "UECapabilityInformation" includes UE capabilities supported by the terminal 20. The base station 10A identifies the supported UE capabilities, based on the received "UECapabilityInformation", and applies the identified UE capabilities to radio communications with the terminal 20.

For example, "UECapabilityInformation" includes EN-DC band combination capabilities (UE-MRDC-Capability, UE-E UTRA-Capability, UE-NR-Capability). EN-DC band combinations are configured in "UE-MRDC-Capability", and are referred to by the base station 10A as an eNB and by a base station 10B as a gNB. An LTE part of bandwidth, a number of layers, and a modulation method are configured in "UE-EUTRA-Capability", and are referred to by the base station 10A as an eNB. NR part of bandwidth, a number of layers, and a modulation method are configured in "UE-NR-Capability", and are referred to by the base station 10B as a gNB.

As described above, there are LTE part of capabilities and NR part of capabilities in EN-DC band combination capabilities. LTE part of specific capabilities (bandwidth and a number of layers) are specified by an information element "featureSetsEUTRA" that is included in "UE-EUTRA-Capability" that is referred to by the base station 10A as an eNB. NR part of specific capabilities (bandwidth and a number of layers) are specified by an information element "featureSets" that is included in "UE-NR-Capability" that is referred to by the base station 10B as a gNB. According to the technical standard specifications, the eNB is not required to perform configuration by interpreting "UE-NR-Capability", and the gNB is not required to perform configuration by interpreting "UE-EUTRA-Capability".

In subsequent step S3, the base station 10A transmits, to the base station 10B as a gNB, "SgNB Addition Request", that is, a secondary gNB addition request, via an X2 interface. "SgNB Addition Request" includes RRC information elements "CG-Configinfo" and "allowedBC-ListMRDC".

"allowedBC-ListMRDC" includes a list of indexes referring to EN-DC band combinations included in "UE-MRDC-Capability", the EN-DC band combinations being selected from secondary group band combinations. A secondary gNB is allowed to perform selection from the secondary group band combinations.

In addition, "CG-Configinfo" includes an information element "eutra-CapabilityInfo". "UE-MRDC-Capability" and "UE-NR-Capability", which are obtained from the terminal 20, are configured in "eutra-CapabilityInfo".

In subsequent step S4, the base station 10B transmits, to the base station 10A, "SgNB Addition Request Acknowledge", that is, a secondary gNB addition request acknowledgment, via an X2 interface. "SgNB Addition Request Acknowledge" includes RRC information elements "CG-Config" and "selectedbandCombination".

"selectedbandCombination" indicates indexes of EN-DC band combinations selected by the secondary gNB.

Subsequently, the base station 10A and the base station 10B may use the EN-DC band combination selected by the base station 10B to perform communications with the terminal 20, wherein EN-DC is applied to the communications.

Figure 4:
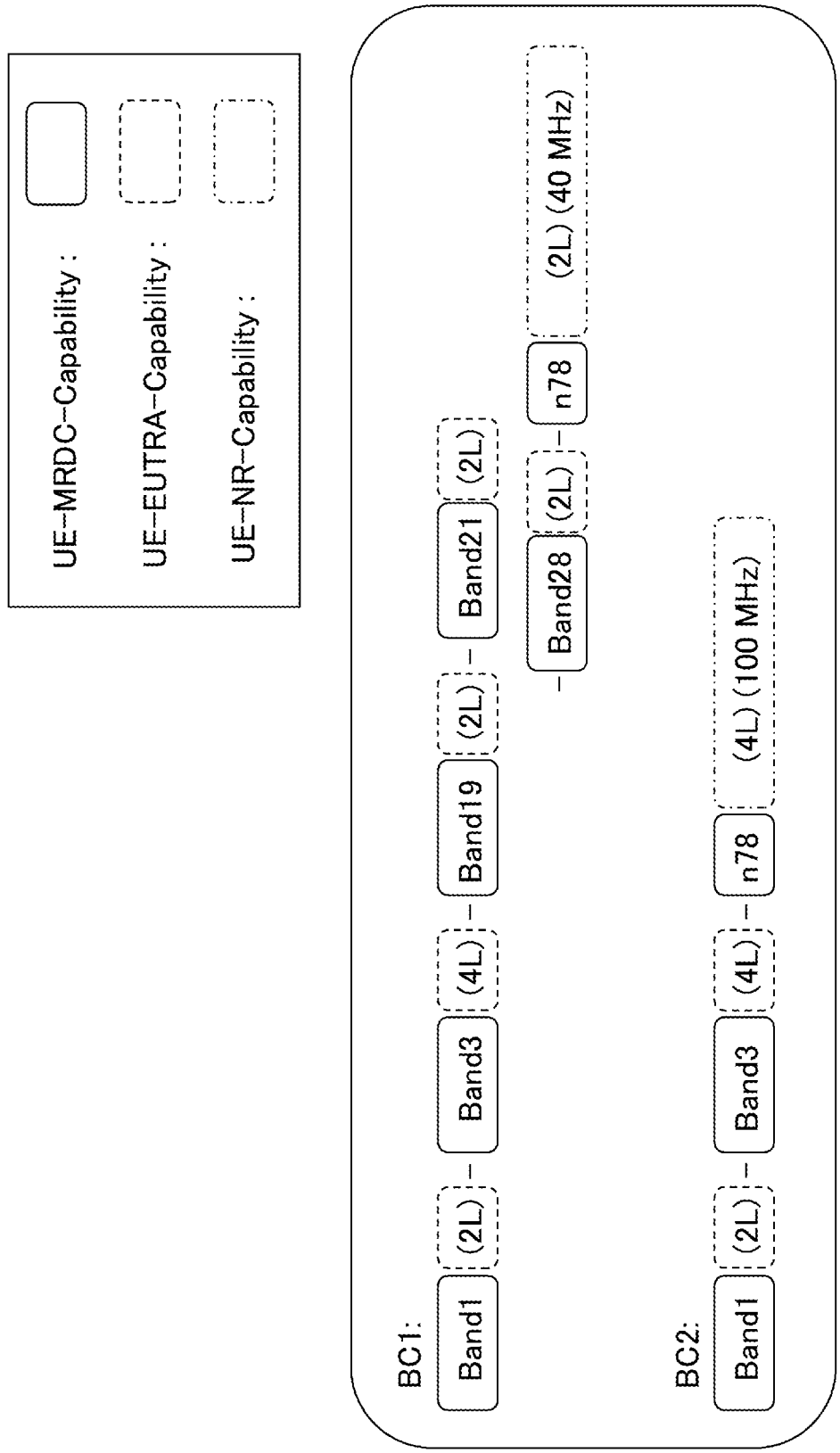
FIG. 4 is a drawing illustrating an example of a terminal capability related to band combinations.

FIG. 4 is a drawing illustrating an example of a terminal capability related to band combinations. As shown in FIG. 4, "UE-MRDC-Capability", which is referenced to by the eNB and the gNB, corresponds to "Band1", "Band3", "Band19", "Band21", "Band28", and "n78" in an EN-DC band combination example "BC1". In addition, "UE-MRDC-Capability" corresponds to "Band1", "Band3", and "n78" in an EN-DC band combination example "BC2".

As shown in FIG. 4, the present "UE-EUTRA-Capability", which is referenced to by the eNB and the gNB, corresponds to "2L", "4L", "2L", "2L", and "2L" in an EN-DC band combination example "BC1". Note that 2L indicates 2 layers, and 4L indicates 4 layers. In addition, "UE-EUTRA-Capability" corresponds to "2L" and "4L" in an EN-DC band combination example "BC2".

As shown in FIG. 4, "UE-NR-Capability", which is referenced to by the eNB and the gNB, corresponds to "(2L(40 MHz)" in an EN-DC band combination example "BC1". In addition, "UE-NR-Capability" corresponds to "(4L(100 MHz)" in an EN-DC band combination example "BC2".

Here, the EN-DC band combinations at the terminal 20 are managed by the entire bandwidth (e.g., a number of CCs) and number of layers, of the terminal 20, in relation to the signal processing capability, and there may be cases 1) and 2) of the EN-DC band combinations as shown below.

1) The bandwidth (a number of CCs) and the number of layers are greater in LTE, and the bandwidth (a number of CCs) and the number of layers are less in NR.
2) The bandwidth (a number of CCs) and the number of layers are less in LTE, and the bandwidth (a number of CCs) and the number of layers are greater in NR.

Therefore, it is necessary to select the EN-DC band combinations by comprehensively determining the possible configurations of the LTE part and the NR part. On the other hand, there is a case in which, if the eNB configures, to "allowedBC-ListMRDC", only the EN-DC band combinations from an LTE viewpoint, only the EN-DC band combinations, which cannot be selected from a gNB viewpoint, may be indicated, and EN-DC cannot be configured.

Figure 5:
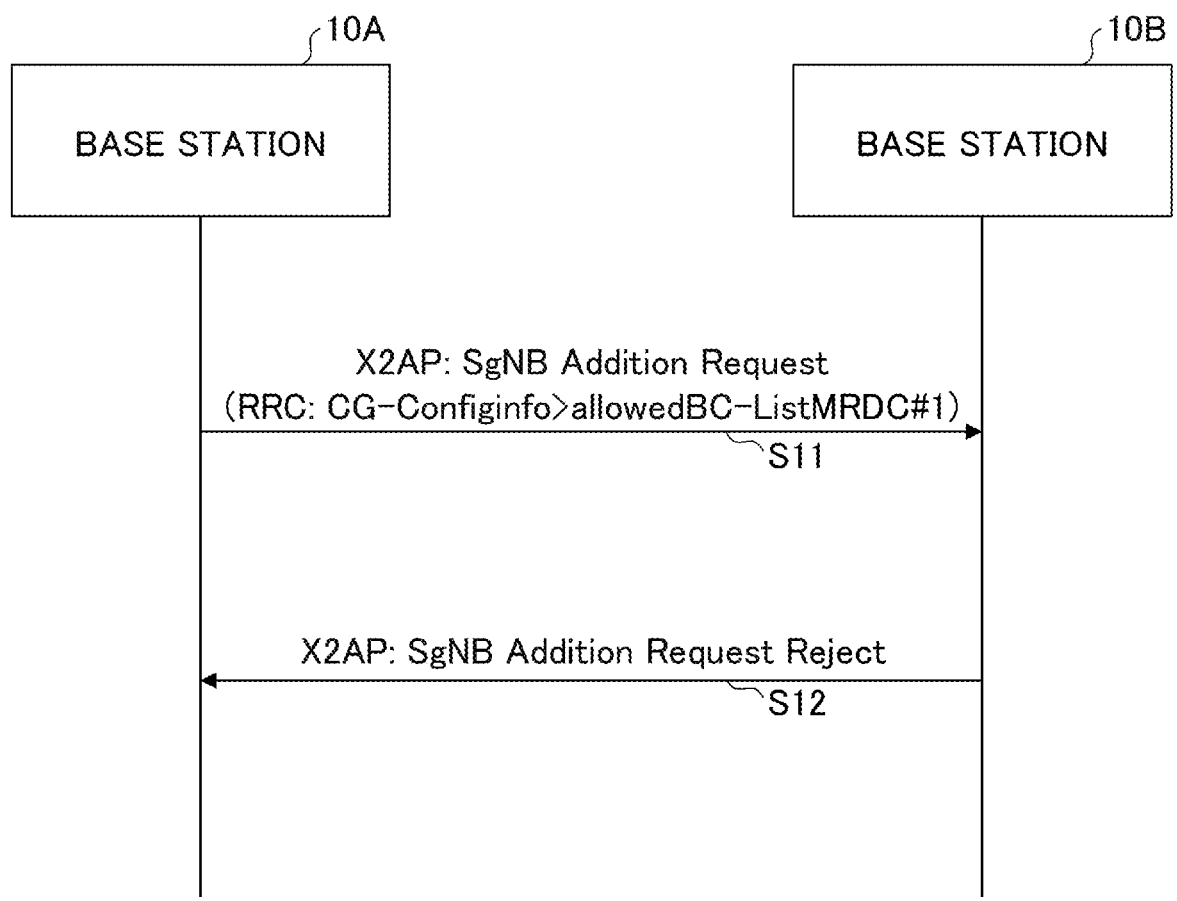
FIG. 5 is a sequence diagram illustrating an example (2) of a communication configuration.

FIG. 5 is a sequence diagram illustrating an example (2) of a communication configuration. In a case where an NR part of bandwidth is a bandwidth with which gNB is not operated, EN-DC cannot be configured with the band combinations. For example, as shown in Table 1, it is assumed that the terminal 20 supports the EN-DC band combinations 1) and 2) shown below, and the network operates the NR at 100 MHz bandwidth.

1) LTE 5CCs+NR(40 MHz bandwidth)
2) LTE 2CCs+NR(100 MHz bandwidth)

TABLE 1

| allowedBC-ListMRDC | LTE | NR |
| --- | --- | --- |
| #1 | LTE-5CC | NR(40 MHz bandwidth) |
| #2 | LTE-2CC | NR(100 MHz bandwidth) |

Here, in Step S11 shown in FIG. 5, in a case where only the EN-DC band combination of 1), in which LTE-5CC is available, is configured to "allowedBC-ListMRDC" by the base station 10A as an eNB, and the configured "AllowedBC-ListMRDC" is transmitted to the base station 10B as a gNB via the X2 interface, because no EN-DC band combination selectable by the base station 10B is included in the "AllowedBC-ListMRDC", as shown in Step S12 of FIG. 5, the "SgNB Addition Request Reject," that is, the secondary gNB addition request reject response, is transmitted to the base station 10A from the base station 10B via the X2 interface.

As described above, in the EN-DC band combinations shown in 1) and 2) above, the base station 10A does not refer to information on NR (40 MHz bandwidth) and NR (100 MHz bandwidth).

As another example, as shown in Table 1, it is assumed that the terminal 20 supports the EN-DC band combinations 1)-3) shown below, and the LTE area quality status is better in LTE 1.7 GHz than in LTE 1.5 GHz, and the NR side is operating at 100 MHz bandwidth.
1) LTE 5CCs+NR(40 MHz bandwidth)
2) LTE 2 GHz (20 MHz bandwidth)+LTE 1.5 GHz (15 MHz bandwidth)+NR 3.7 GHz (100 MHz bandwidth)
3) LTE 2 GHz (20 MHz bandwidth)+LTE 1.7 GHz (20 MHz bandwidth)+NR 3.7 GHz (100 MHz bandwidth)

TABLE 2

| allowedBC-ListMRDC | LTE | NR |
|---|---|---|
| #1 | LTE-5CC | NR(40 MHz bandwidth) |
| #2 | LTE-2 GHz(20 MHz bandwidth) + LTE-1.5 GHz(15 MHz bandwidth) | NR-3.7 GHz(100 MHz bandwidth) |
| #3 | LTE-2 GHz(20 MHz bandwidth) + LTE-1.7 GHz(20 MHz bandwidth) | NR-3.7 GHz(100 MHz bandwidth) |

In a case where the base station 10A as an eNB does not narrow down the EN-DC band combinations from a PCell viewpoint on the LTE side, the base station 10B as a gNB does not necessarily determine the EN-DC band combinations taking into account the LTE part of capabilities, because the base station 10B determines the EN-DC band combinations by referring to only the NR part of capabilities.

In an example in which the above cases of 1)-3) are indicated to the base station 10B through "allowedBC-ListMRDC" in step S11, because the NR side is operated with 100 MHz bandwidth, 1) of the 40 MHz bandwidth is not selected by the base station 10B. Furthermore, because 2) and 3) have the same capability on the NR side, it is expected that the base station 10B will select 3) in which the total bandwidth on the LTE side is wider and the area quality is better. However, because the base station 10B does not refer to the information of the LTE side, there is a possibility that the base station 10B will not select 3). That is, the base station 10B may select EN-DC band combinations of 2) whose throughput is worse than 3).

As described above, in the EN-DC band combinations shown in 1)-3) above, the base station 10B does not refer to information of LTE 5CCs, LTE 2 GHz (20 MHz bandwidth)+LTE 1.5 GHz (15 MHz bandwidth) and LTE 2 GHz (20 MHz bandwidth)+LTE 1.7 GHz (20 MHz bandwidth).

Therefore, with respect to the EN-DC band combinations indicated to the gNB as a solution candidate, the following operations may be specified for the eNB and the gNB.

The eNB configures a list to "AllowedBC-ListMRDC" to be indicated to the gNB in a way in which the list is listed without performing the narrowing down from a viewpoint other than the viewpoint of the LTE-side PCell and the list is listed in an order from the best EN-DC band combinations only from a viewpoint of the LTE part.

The gNB selects the EN-DC band combinations from the list of "AllowedBC-ListMRDC", from a viewpoint of the NR part. In a case where the NR part of capabilities are the same, the gNB selects an EN-DC band combination with an earlier position in the list.

Figure 6:
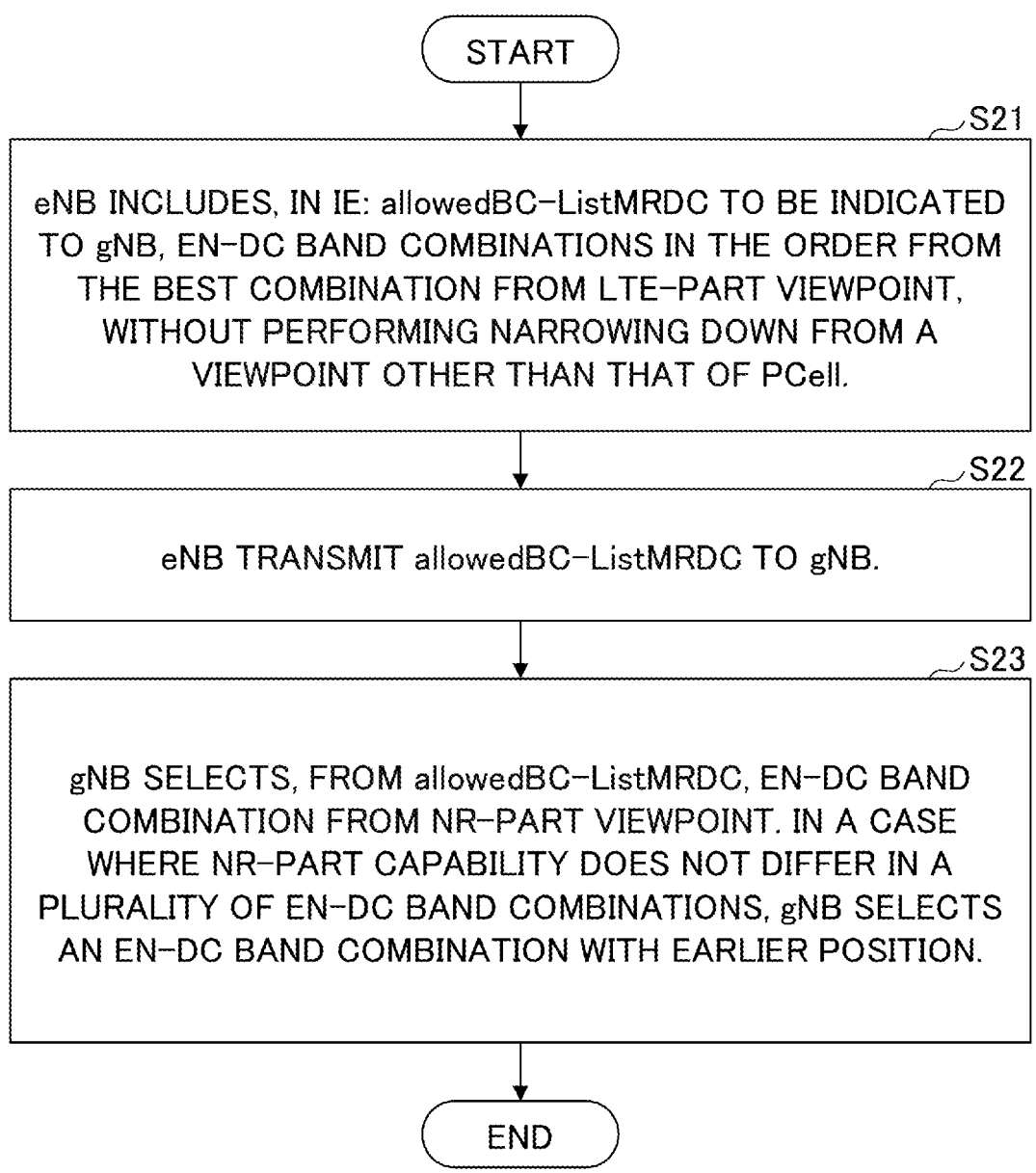
FIG. 6 is a flowchart illustrating an example (1) of a band combination selection according to an embodiment of the present invention.

FIG. 6 is a flowchart illustrating an example (1) of a band combination selection according to an embodiment of the present invention. In step S21, the eNB configures a list in "AllowedBC-ListMRDC" to be indicated to the gNB in a way in which the list is listed without performing the narrowing down from a viewpoint other than that of the LTE-side PCell and the list is listed in an order from the best EN-DC band combinations from a viewpoint of the LTE part.

As an example, it is assumed that the terminal 20 supports the EN-DC band combinations 1)-3) shown below, and the LTE area quality status in LTE 1.7 GHz is better than that in LTE 1.5 GHz, and the NR side is operating with 100 MHz bandwidth.
1) LTE 5CCs+NR (40 MHz bandwidth)
2) LTE 2 GHz (20 MHz bandwidth)+LTE 1.5 GHz (15 MHz bandwidth)+NR 3.7 GHz (100 MHz bandwidth)
3) LTE 2 GHz (20 MHz bandwidth)+LTE 1.7 GHz (20 MHz bandwidth)+NR 3.7 GHz (100 MHz bandwidth)

In step S21, as shown in Table 3, a list of EN-DC band combinations is configured to "allowedBC-ListMRDC" in an order of 1), 3), and 2), that is, in an order of higher performance from a viewpoint of the LTE side.

TABLE 3

| allowedBC-ListMRDC | LTE | NR |
|---|---|---|
| #1 | LTE-5CC | NR(40 MHz bandwidth) |
| #2 | LTE-2 GHz(20 MHz bandwidth) + LTE-1.7 GHz(20 MHz bandwidth) | NR-3.7 GHz(100 MHz bandwidth) |
| #3 | LTE-2 GHz(20 MHz bandwidth) + LTE-1.5 GHz(15 MHz bandwidth) | NR-3.7 GHz(100 MHz bandwidth) |

In subsequent step S22, the eNB transmits "allowedBC-ListMRDC" to the gNB.

In step S23, the gNB selects, from "allowedBC-ListMRDC", the EN-DC band combinations from a viewpoint of the NR part. In a case where the capabilities of the NR part are not different among a plurality of EN-DC band combinations, the gNB selects an EN-DC band combination with an earlier position in the list.

In an example of 1)-3) above, in step S23, 1) indicated by "AllowedBC-ListMRDC" is not selected because the NR side is not operating with 100 MHz bandwidth. Because 2) and 3) indicated by "AllowedBC-ListMRDC" both have the same NR-side capability with the 100 MHz bandwidth, the gNB selects 3) whose order is earlier in the list.

In addition, with respect to the EN-DC band combination "AllowedBC-ListMRDC" that is indicated to gNB as a solution candidate, the following operations may be specified in the eNB and the gNB, by allowing the indication of the priority from a viewpoint of the LTE part (for example, the priority may be indicated by a new information element).

The eNB explicitly indicates, to the gNB, the priority of each of the EN-DC band combinations from a viewpoint of the LTE part, without performing narrowing down of "AllowedBC-ListMRDC" to be indicated to the gNB, from a viewpoint other than that of the LTE side PCell.

The gNB selects an EN-DC band combination from the list of "AllowedBC-ListMRDC", from a viewpoint of the NR part. In a case where NR part of capabilities are the same, the gNB selects an EN-DC band combination with higher priority, based on the priority indicated by the eNB.

Figure 7:
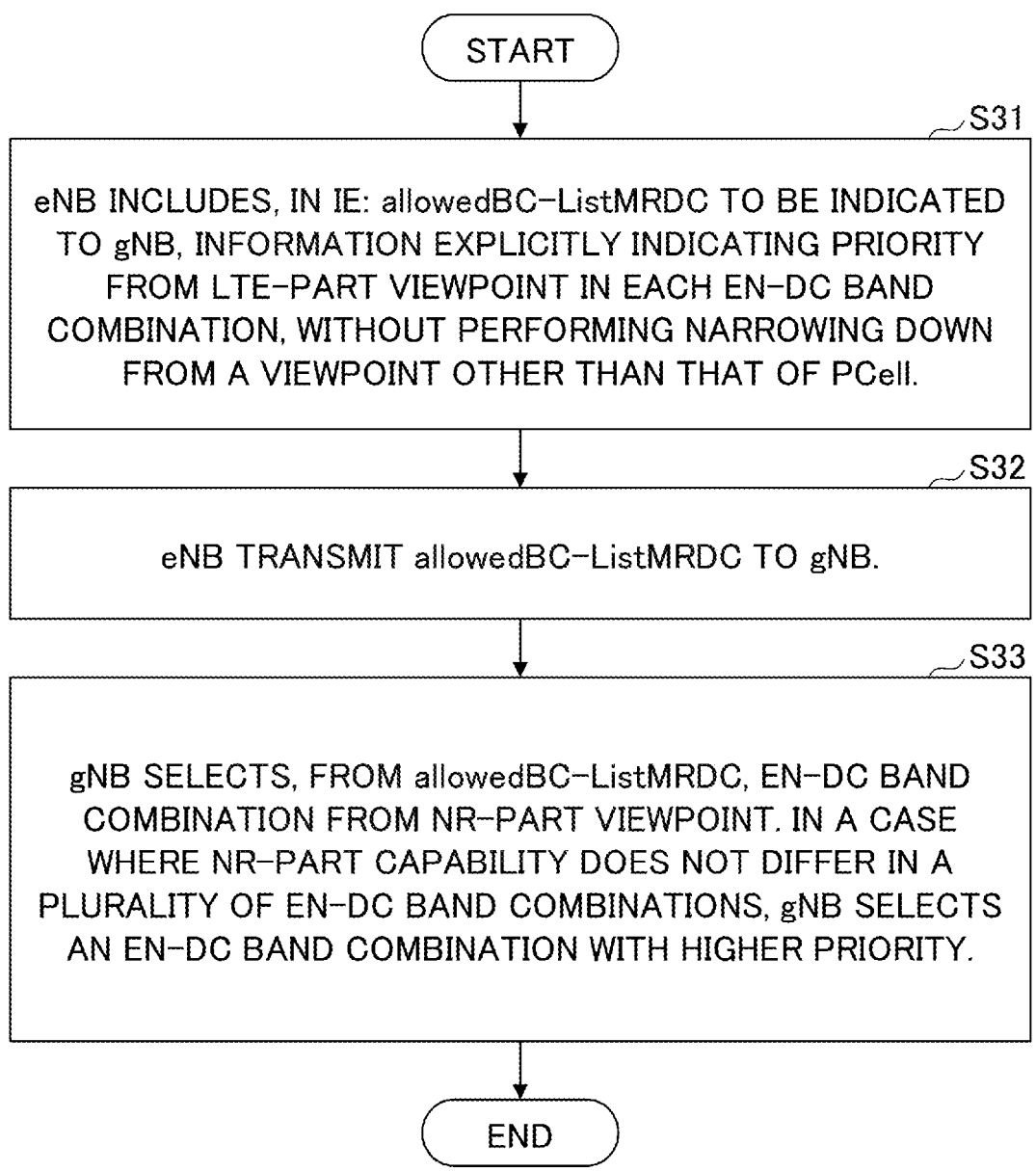
FIG. 7 is a flowchart illustrating an example (2) of a band combination selection according to an embodiment of the present invention.

FIG. 7 is a flowchart illustrating an example (2) of a band combination selection according to an embodiment of the present invention. In step S31, with respect to the information element "AllowedBC-ListMRDC" to be indicated to the gNB, the eNB further includes, in the list of EN-DC band combinations, information explicitly indicating the priority of each of the EN-DC band combinations, from a viewpoint of the LTE part, without performing narrowing down from a viewpoint other than that of the LTE side of PCell.

As an example, it is assumed that the terminal 20 supports the EN-DC band combinations 1)-3) shown below, and the LTE area quality status in LTE 1.7 GHz is better than that in LTE 1.5 GHz, and the NR side is operating with 100 MHz bandwidth.
1) LTE 5CCs+NR (40 MHz bandwidth)
2) LTE 2 GHz (20 MHz bandwidth)+LTE 1.5 GHz (15 MHz bandwidth)+NR 3.7 GHz (100 MHz bandwidth)
3) LTE 2 GHz (20 MHz bandwidth)+LTE 1.7 GHz (20 MHz bandwidth)+NR 3.7 GHz (100 MHz bandwidth)

In step S31, a list of EN-DC band combinations including information indicating priorities is configured to "allowedBC-ListMRDC", where 1) is priority 1, 2) is priority 3, and 3) is priority 2, depending on the performance of the LTE viewpoint, as shown in Table 4. Here, the value indicating priority is defined as the lower the value, the higher the priority.

TABLE 4

| allowedBC-ListMRDC | Priority | LTE | NR |
|---|---|---|---|
| #1 | 1 | LTE-5CC | NR(40 MHz bandwidth) |
| #2 | 3 | LTE-2 GHz(20 MHz bandwidth) + LTE-1.5 GHz(15 MHz bandwidth) | NR-3.7 GHz(100 MHz bandwidth) |
| #3 | 2 | LTE-2 GHz(20 MHz bandwidth) + LTE-1.7 GHz(20 MHz bandwidth) | NR-3.7 GHz(100 MHz bandwidth) |

Note that the value indicating the priority may be defined as: the lower the value, the higher the priority; or the higher the value, the higher the priority. In addition, the information element indicating the priority may be attached to each entry of the EN-DC band combinations of the list, or it may be an information element separately indicated from entries of the EN-DC band combinations of the list.

In subsequent step S32, the eNB transmits "allowedBC-ListMRDC" to the gNB.

In step S33, the gNB selects, from "allowedBC-ListMRDC", an EN-DC band combination from a viewpoint of the NR part. In a case where the capabilities of the NR part are not different among a plurality of EN-DC band combinations, the gNB selects an EN-DC band combination with higher priority.

In an example of 1)-3) above, in step S33, 1) indicated by "AllowedBC-ListMRDC" is not selected because the NR side is not operating with 100 MHz bandwidth. Because 2) and 3) indicated by "AllowedBC-ListMRDC" both have the same NR-side capability with the 100 MHz bandwidth, the gNB selects 3) whose value indicating the priority is lower, that is, whose priority is higher.

The above-described embodiments allow the terminal 20 to select an optimum EN-DC band combination from a throughput perspective that comprehensively considers the performance of the LTE part and the NR part, and is expected to improve the user experience.

In other words, it is possible to improve performance at the time of dual connectivity in a wireless communication system.

(Apparatus Configuration)

Next, a functional configuration example of the base station 10 and the terminal 20 for performing the processes and operations described above will be described. The base station 10 and terminal 20 include functions for implementing the embodiments described above. It should be noted, however, that each of the base stations 10 and the terminal 20 may include only some of the functions in an embodiment.

<Base Station 10>

Figure 8:
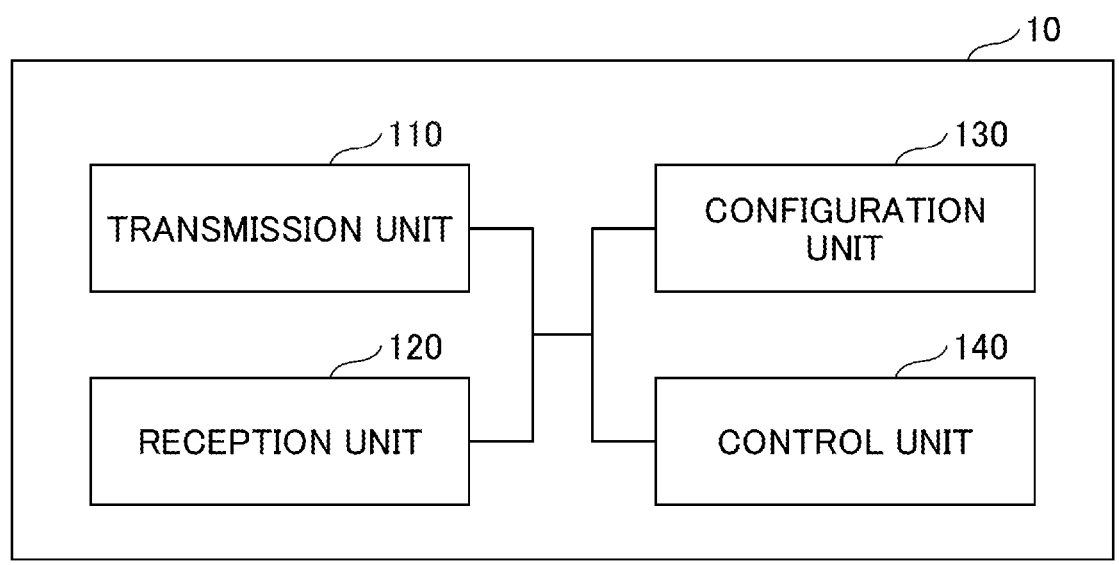
FIG. 8 is a drawing illustrating an example of a functional structure of a base station 10 according to an embodiment of the present invention.

FIG. 8 is a drawing illustrating an example of a functional structure of a base station 10 according to an embodiment of the present invention. As shown in FIG. 8, the base station 10 includes a transmission unit 110, a reception unit 120, a configuration unit 130, and a control unit 140. The functional structure illustrated in FIG. 8 is merely an example. Functional divisions and names of functional units may be anything as long as it can perform operations according to an embodiment of the present invention.

The transmission unit 110 includes a function for generating a signal to be transmitted to the terminal 20 side and transmitting the signal wirelessly. Further, the transmission unit 110 transmits an inter-network-node message to another network node. The reception unit 120 includes a function for receiving various signals transmitted from the terminal 20 and acquiring, for example, information of a higher layer from the received signals. Further, the transmission unit 110 has a function to transmit NR-PSS, NR-SSS, NR-PBCH, DL/UL control signals, and the like to the terminal 20. Further, the reception unit 120 receives an inter-network-node message from another network node.

The configuration unit 130 stores preset information and various configuration information items to be transmitted to the terminal 20. Contents of the configuration information are, for example, information related to the transmission and reception configurations depending on the UE capabilities of the terminal 20.

As described in an embodiment of the present invention, the control unit 140 performs control pertaining to the processing of the UE capability report regarding the radio parameters received from the terminal 20. Further, the control unit 140 controls communications with the terminal 20 based on the radio-parameter-related UE capability report that is received from the UE 20. The functional units related to signal transmission in the control unit 140 may be included in the transmission unit 110, and the functional units related to signal reception in the control unit 140 may be included in the reception unit 120.

<Terminal 20>

Figure 9:
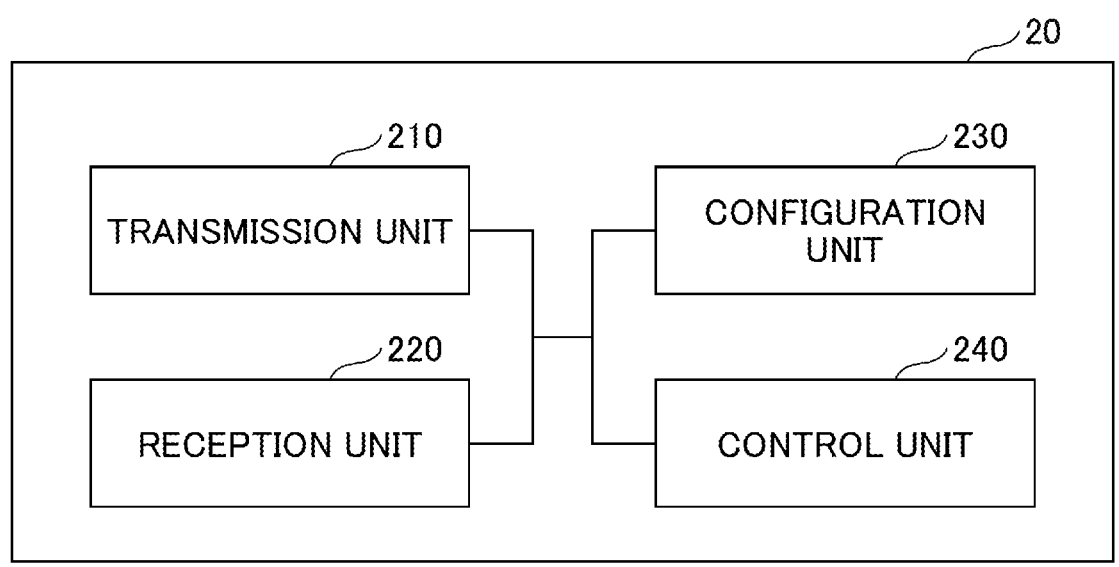
FIG. 9 is a drawing illustrating an example of a functional structure of a terminal 20 according to an embodiment of the present invention.

FIG. 9 is a drawing illustrating an example of a functional structure of a terminal 20 according to an embodiment of the present invention. As shown in FIG. 9, the terminal 20 includes a transmission unit 210, a reception unit 220, a configuration unit 230, and a control unit 240. The functional structure illustrated in FIG. 9 is merely an example. Functional divisions and names of functional units may be anything as long as it can perform operations according to an embodiment of the present invention.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL/SL control signals, etc., transmitted from the base station 10. Further, for example, with respect to the D2D communications, the transmission unit 210 transmits, to another terminal 20, PSCCH (Physical Sidelink Control Channel), PSSCH (Physical Sidelink Shared Channel), PSDCH (Physical Sidelink Discovery Channel), PSBCH (Physical Sidelink Broadcast Channel), etc., and the reception unit 120 receives, from the another terminal 20, PSCCH, PSSCH, PSDCH, or PSBCH.

The configuration unit 230 stores various configuration information items received by the reception unit 220 from the base station 10. Further, the configuration unit 230 also stores pre-configured configuration information. Contents of the configuration information are, for example, information related to the transmission and reception configurations depending on the UE capabilities.

As described in an embodiment of the present invention, the control unit 240 performs control pertaining to the UE capability report regarding the radio parameters of the terminal 20. The functional units related to signal transmission in the control unit 240 may be included in the transmission unit 210, and the functional units related to signal reception in the control unit 240 may be included in the reception unit 220.

(Hardware Structure)

In the above functional structure diagrams used for describing an embodiment of the present invention (FIG. 8 and FIG. 9), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 10:
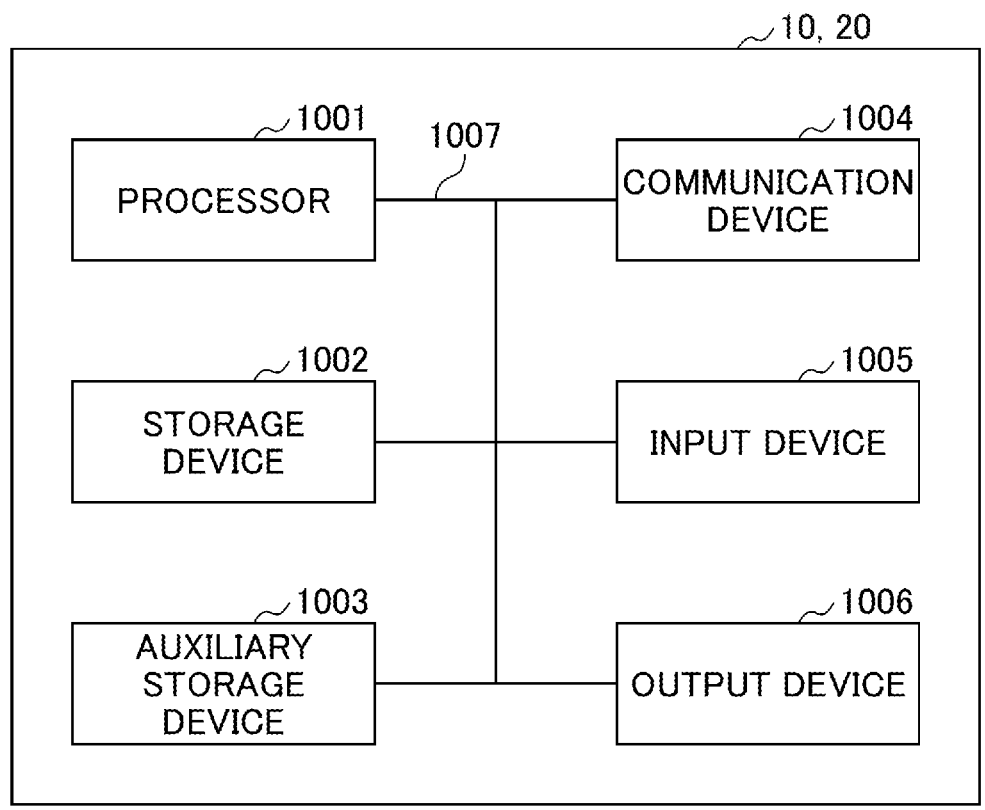
FIG. 10 is a drawing illustrating an example of a hardware structure of the base station 10 or the terminal 20 according to an embodiment of the present invention.

For example, the base station 10, terminal 20, etc., according to an embodiment of the present disclosure may function as a computer for processing the radio communication method of the present disclosure. FIG. 10 is a drawing illustrating an example of hardware structures of the base station 10 and terminal 20 according to an embodiment of the present invention. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station 10 and terminal 20 may include one or more of each of the devices illustrated in the figure, or may not include some devices.

Each function in the base station 10 and terminal 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads out onto the storage device 1002 a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station 10 illustrated in FIG. 8 may be realized by control programs that are stored in the storage device 1002 and are executed by the processor 1001. Further, for example, the control unit 240 of the terminal 20 illustrated in FIG. 9 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission and reception device) for communicating with computers via at least one of a wired network and a wireless network, and may be referred to as a network device, a network controller, a network card, a communication module, etc. The communication device 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output apparatus 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, storage device 1002, etc., are connected to each other via the bus 1007 used for communicating information. The bus 1007 may include a single bus, or may include different buses between the apparatuses.

Further, each of the base station 10 and terminal 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, a base station is provided. The base station includes a transmission unit configured to transmit, to a terminal, a message for requesting a report of terminal capability, in a first radio access technology (RAT); a reception unit configured to receive a message of a terminal capability report including a capability related to the first RAT, a capability related to a second RAT, and a capability related to dual connectivity that uses the first RAT and the second RAT, in the first RAT; and a control unit configured to determine a candidate list of band combinations used for the dual connectivity, the candidate list being determined based on the capability related to the first RAT, wherein the transmission unit transmits the candidate list to a base station in the second RAT, and the reception unit receives, from the base station in the second RAT, information indicating a preferable band combination selected from the candidate list, based on the capability related to the second RAT, by the base station in the second RAT.

The above-described arrangements allow the terminal 20 to select an optimum EN-DC band combination from a throughput point of view that comprehensively considers the performance of the LTE part and the NR part, and is expected to improve the user experience. In other words, it is possible to improve performance at the time of dual connectivity in a wireless communication system.

The control unit may arrange the band combinations included in the candidate list in an order of better performances in the first RAT. This arrangement allows the terminal 20 to select an optimum EN-DC band combination from a throughput perspective that comprehensively considers the performance of the LTE part and the NR part.

The control unit may add a priority to each of the band combinations included in the candidate list. This arrangement allows the terminal 20 to select an optimum EN-DC band combination from a throughput perspective that comprehensively considers the performance of the LTE part and the NR part.

In addition, according to an embodiment of the present invention, a base station is provided. The base station includes a reception unit configured to receive a candidate list of band combinations used for dual connectivity that uses a first RAT and a second RAT, from a base station in the first RAT, the band combinations being determined based on a capability related to the first RAT; a control unit configured to select a preferable band combination to be used for the dual connectivity from the candidate list, based on a capability related to the second RAT; and a transmission unit configured to transmit, to the base station in the first RAT, information indicating the selected band combination to the base station in the first RAT.

The above-described arrangements allow the terminal 20 to select an optimum EN-DC band combination from a throughput point of view that comprehensively considers the performance of the LTE part and the NR part, and is expected to improve the user experience. In other words, it is possible to improve performance at the time of dual connectivity in a wireless communication system.

In addition, according to an embodiment of the present invention, a terminal is provided. The terminal includes a reception unit configured to receive, from a base station in a first radio access technology (RAT), a message requesting a report of terminal capability; a control unit configured to include, in a message reporting terminal capability, based on the message requesting the report of terminal capability, a capability related to the first RAT, a capability related to a second RAT, and a capability related to dual connectivity that uses the first RAT and the second RAT; and a transmission unit configured to transmit, to the base station in the first RAT, the message reporting terminal capability, wherein the reception unit and the transmission unit perform communications via dual connectivity using band combinations preferable in the first RAT and the second RAT, respectively.

The above-described arrangements allow the terminal 20 to select an optimum EN-DC band combination from a throughput point of view that comprehensively considers the performance of the LTE part and the NR part, and is expected to improve the user experience. In other words, it is possible to improve performance at the time of dual connectivity in a wireless communication system.

As described above, according to an embodiment of the present invention, a communication method is provided. The communication method includes transmitting, to a terminal, a message for requesting a report of terminal capability, in a first radio access technology (RAT); receiving a message of a terminal capability report including a capability related to the first RAT, a capability related to a second RAT, and a capability related to dual connectivity that uses the first RAT and the second RAT, in the first RAT; and determining a candidate list of band combinations used for the dual connectivity, the candidate list being determined based on the capability related to the first RAT, wherein the transmitting includes transmitting the candidate list to a base station in the second RAT, and the receiving includes receiving, from the base station in the second RAT, information indicating a preferable band combination selected from the candidate list, based on the capability related to the second RAT, by the base station in the second RAT.

The above-described arrangements allow the terminal 20 to select an optimum EN-DC band combination from a throughput point of view that comprehensively considers the performance of the LTE part and the NR part, and is expected to improve the user experience. In other words, it is possible to improve performance at the time of dual connectivity in a wireless communication system.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication (transmission, notification) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PDCCH, PDCCH) and information elements may be identified by any suitable names, the various names assigned to these various channels and information elements are not used as limitations.

In the present disclosure, the terms "BS: Base Station", "Radio Base Station", "Base Station Apparatus", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission device, reception device, communication device, or the like. The at least one of the base station and the mobile station may be a device mounted on the mobile station, the mobile station itself, or the like.

The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple terminals 20 (e.g., may be referred to as D2D (Device-to-Device), V2X (Vehicle-to-Everything), etc.). In this case, the function of the base station 10 described above may be provided by the terminal 20. Further, the phrases "up" and "down" may also be replaced by the phrases corresponding to terminal-to-terminal communication (e.g., "side"). For example, an uplink channel, a downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming," "expecting," or "considering," etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "base on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts," "circuits," "devices," etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.) may be replaced with a TTI having a time length exceeding 1 ms, and the short TTI (e.g., shortened TTI, etc.) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in a RB may be the same, regardless of the numerology, and may be 12, for example. The number of subcarriers included in a RB may be determined on the basis of numerology.

Further, the time domain of an RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), subcarrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a UE, one or more BWPs may be configured in one carrier.

At least one of the configured BWPs may be activated, and the UE may assume that the UE will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in an RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

An aspect/embodiment described in the present specification may be used independently, may be used in combination, or may be used by switching according to operations. Further, indication (transmission/reporting) of predetermined information (e.g., indication (transmission/reporting) of "X") is not limited to an explicit indication (transmission/reporting), and may be performed by an implicit indication (transmission/reporting) (e.g., by not performing indication (transmission/reporting) of the predetermined information).

Noted that, in the present disclosure, the "UECapabilityEnquiry" is an example of a message for requesting an report of terminal capabilities. The "UECapabilityInformation" is an example of a message for reporting the terminal capabilities. UE-MRDC-Capability is an example of a capability related to Dual Connectivity. UE-EUTRA-Capability is an example of a capability related to a first RAT. UE-NR-Capability is an example of a capability related to a second RAT. allowedBC-ListMRDC is an example of a candidate list of band combinations used for dual connectivity. selectedBandCombination is an example of information indicating preferable band combinations selected by a base station in the second RAT.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Storage device
1003 Auxiliary storage device
1004 Communication device
1005 Input device
1006 Output device

What is claimed is:

1. A base station that is a first base station performing dual connectivity together with a second base station, the base station comprising:
a processor configured to determine a candidate list of band combinations used for the dual connectivity, the candidate list being determined based on a capability related to the first base station;
a transmitter configured to transmit the candidate list to the second base station; and
a receiver configured to receive, from the second base station, information indicating a preferable band combination selected from the candidate list by the second base station,
wherein the processor arranges the band combinations included in the candidate list, in an order determined from a viewpoint in the first base station.

2. The base station as claimed in claim 1, wherein the information is selected from the candidate list based on a capability related to the second base station.

3. The base station as claimed in claim 1, wherein
the transmitter transmits, to a terminal, a message for requesting a report of terminal capability, in a radio access technology (RAT) of the first base station, and
the receiver receives, from the terminal, a message of a terminal capability report including a capability related to the first base station, in the RAT of the first base station.

4. The base station as claimed in claim 1, wherein
the transmitter transmits, to a terminal, a message for requesting a report of terminal capability, in a radio access technology (RAT) of the first base station, and
the receiver receives, from the terminal, a message of a terminal capability report including a capability related to the first base station, a capability related to a second base station, and a capability related to dual connectivity that uses the first base station and the second base station, in the RAT of the first base station.

5. A terminal comprising:
a receiver configured to receive, from a first base station, a message requesting a report of terminal capability;
a processor configured to include, in a message reporting terminal capability, based on the message requesting the report of terminal capability, a capability related to the first base station, a capability related to a second base station, and a capability related to dual connectivity that uses the first base station and the second base station; and
a transmitter configured to transmit, to the first base station, the message reporting terminal capability,
wherein the receiver and the transmitter perform communications via dual connectivity using band combinations preferable in the first base station and the second base station, respectively, and
wherein the processor arranges the band combinations included in the candidate list, in an order determined from a viewpoint in the first base station.

6. A communication method performed by a base station, the communication method comprising:
determining a candidate list of band combinations used for the dual connectivity, the candidate list being determined based on a capability related to a first base station;
transmitting the candidate list to a second base station; and
receiving, from the second base station, information indicating a preferable band combination selected from the candidate list by the second base station,
wherein the base station arranges the band combinations included in the candidate list, in an order determined from a viewpoint in the first base station.

7. A base station that is a second base station performing dual connectivity together with a first base station, the base station comprising:

a receiver configured to receive, from the first base station, a candidate list of band combinations used for the dual connectivity, the candidate list being based on a capability related to the first base station;

a processor configured to select, from the candidate list, a band combination candidate used for the dual connectivity, the band combination candidate being selected based on a capability related to the second base station; and a transmitter configured to transmit information indicating the selected band combination candidate to the first base station, wherein the processor arranges the band combinations included in the candidate list, in an order determined from a viewpoint in the first base station.

8. A wireless communication system comprising: a first base station; and a second base station, wherein the first base station includes:

a first processor configured to determine a candidate list of band combinations used for dual connectivity, the candidate list being determined based on a capability related to the first base station;

a first transmitter configured to transmit the candidate list to the second base station; and a first receiver configured to receive, from the second base station, information indicating a preferable band combination selected from the candidate list by the second base station, wherein the first processor is configured to arrange the band combinations included in the candidate list, in an order determined from a viewpoint in the first base station, and the second base station includes:

a second receiver configured to receive the candidate list from the first base station;

a second processor configured to select, from the candidate list, a band combination candidate used for the dual connectivity, the band combination candidate being selected based on a capability related to the second base station; and a second transmitter configured to transmit information indicating the selected band combination candidate to the first base station.

* * * * *